United States Patent Office 3,083,190
Patented Mar. 26, 1963

3,083,190
NEW ACRYLIC COPOLYMERS CONTAINING THE NORBORNENE NUCLEUS AND COATING COMPOSITIONS CONTAINING SAME
Norman G. Gaylord, Westbury, N.Y., assignor to Interchemical Corporation, New York, N.Y., a corporation of Ohio
No Drawing. Filed Apr. 22, 1959, Ser. No. 807,988
8 Claims. (Cl. 260—80.5)

This invention relates to relatively low-molecular weight, organic solvent soluble acrylic copolymers which have excellent pigment wetting and dispersing properties, can be prepared in relatively concentrated solutions and provide superior surface coatings when in solutions of organic solvents. Such coatings are heat curable and provide glossy, hard, and flexible coatings when cured.

In addition, these new acrylic polymers may be combined with thermosetting amine-aldehyde resins to yield heat-curable surface coatings which adhere well to metal surfaces, are tough and homogeneous, are hard and scratch resistant, exhibit excellent resistance to the attack of alkalies, soaps, and detergents, are flexible, and remarkably stable to discoloration.

For a number of years it has been known that extremely hard thermosetting resins that are stain and scratch resistant can be made by reaction of an aldehyde (preferably formaldehyde) with a polyfunctional amide, such as urea, biuret, dicyandiamide, and (especially) triazines such as ammeline, melamine, substituted melamines, etc. The resulting resins may be prepared in aqueous solutions or in lower alcohols, in which case they are hydrophilic, or they may be produced in the presence of higher alcohols, such as butyl, in which case they are hydrophobic and may be used as a solution in a mixture of equal parts of higher alcohol (e.g., butyl or higher) and aromatic hydrocarbon (e.g., xylene or toluene).

These "amine-aldehyde" resins have proven very valuable in a number of applications. Used by themselves they are excellent for certain molding uses, but without extensive modification they are unsatisfactory for most surface coating applications due to their poor adhesion to many metal surfaces and to their very slight flexibility. This is unfortunate because their low cost, extraordinary hardness and good alkali and detergent resistance all represent properties much sought after for many surface coating applications.

I have discovered that when these amine-aldehyde resins are combined with the new acrylic copolymers of this invention, the resulting blend provides a heat curable surface coating which to a large extent overcomes the above mentioned deficiencies of amine-aldehyde coatings while maintaining the many excellent properties of such coatings.

Copending application Serial Number 768,839, now U.S. Patent No. 2,985,611, filed October 22, 1958, discloses a copolymer which to a great extent overcomes the deficiencies existing in the surface coatings using amine-aldehyde resins. I have now discovered, as set forth hereinabove that our novel acrylic copolymers containing the glycidyl methacrylate monomers not only are useful in overcoming the deficiencies of amine-aldehyde surface coatings but also provide excellent heat curable surface coatings when used alone in organic solvent solutions.

My novel acrylic copolymers are made by bulk or solution addition polymerization of a mixture of (a) a non-allylic alcohol containing the norbornene nucleus, (b) methacrylic acid, (c) glycidyl methacrylate, (d) at least one constituent selected from the group consisting of acrylic type esters having the formula

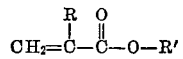

where R is a member selected from the group consisting of hydrogen, methyl and ethyl groups and R′ is an alkyl radical containing from 1 to 8 carbons, and acrylonitrile.

With respect to the non allylic alcohols containing the norbornene nucleus it should be noted that norbornene has the formula

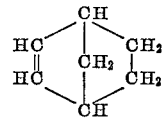

While for the purposes of describing the present invention, I will refer mostly to copolymers of 2-hydroxymethyl-5-norbornene which has the following structure

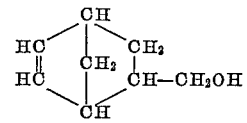

it will be understood that related homologs can readily be used and it is intended that the appended claims will cover the use of such compounds.

2-hydroxymethyl-5-norbornene is readily prepared by condensing allyl alcohol with cyclopentadiene (U.S. Patents No. 2,596,279 and No. 2,352,606). Alkyl substituted cyclopentadienes behave similarly to yield corresponding substituted derivatives. Likewise compounds containing two alcoholic hydroxyl groups can be obtained by condensing an unsaturated diol, such as butenediol with cyclopentadiene.

The glycidyl methacrylate used in this invention may be conveniently prepared from sodium methacrylate and epichlorohydrin by the method set forth in U.S. Patent No. 2,587,981.

In practice of this invention, the copolymerization is preferably conducted in solution and is initiated by "catalysts" or polymerization initiators of the free radical type. The most commonly used initiators are azo compounds and organic peroxygen compounds. Typical of the azo compounds that may be used for this purpose are azobisisobutyronitrile and azobisisovaleronitrile. Typical of the organic peroxygen compounds that may advantageously be used as copolymerization initiators are such compounds as peracetic acid, acetyl peroxide, perbenzoic acid, benzoyl peroxide, lauroyl peroxide, stearoyl peroxide, ditertiary butyl peroxide, tertiary butyl hydroperoxide, methyl ethyl ketone-hydrogen peroxide adduct, and cyclohexanone-hydrogen peroxide.

The non-allylic alcohols containing the norbornene nucleus tend to be somewhat less reactive under copolymerization conditions than typical acrylic monomers, such as acrylic acid, methacrylic acid, their alkyl esters, etc. Accordingly, if they are mixed initially with all of the other polymerizable monomers with which they are to be polymerized, the tendency is for the most reactive monomers to polymerize or copolymerize by themselves at first, with the norbornene alcohol remaining essentially unreacted until the supply of more reactive molecules is substantially exhausted. Such conditions do not favor efficient and uniform incorporation of these less-reactive monomers into a copolymer. We have found that efficient and relatively uniform incorporation of norbornene alcohols into acrylate copolymers occurs when the acrylate and other highly reactive monomers are added slowly (with a catalyst or reaction initiator) to the norbornene alcohol. Accordingly most of the examples which follow will illustrate this technique.

As solvents, we prefer to employ xylene or toluene although benzene, ethyl benzene and petroleum naphthas may also be used.

The following examples will serve to further illustrate the invention.

*Example 1*

A solution of 368 g. of methyl methacrylate, 36 g. of methacrylic acid, 54 g. of glycidyl methacrylate, 12 g. of azobisisobutyronitrile and 300 g. of toluene is added dropwise over a period of 3 hours to a solution of 142 g. of 2-hydroxymethyl-5-norbornene in 300 g. of toluene at 70° C. The reaction is mildly exothermic and intermittent cooling may be required to maintain the temperature at 70° C. The mixture is maintained at 70° C. for an additional 1½ hours, at which time 3 g. of azobisisobutyronitrile is added. The mixture is maintained at 70° C. for an additional 3 hours. The product is a viscous slightly yellow polymer solution which has a 43.4% solids content by weight indicating an 86.8% conversion of monomers to polymer.

The polymer solution is drawn down on a metal panel and baked at 177° C. for 20 minutes. The resulting film shows an excellent cure. It is homogeneous and has a good gloss, and it is slightly brittle. It has high resistance to soaps, solvents and detergents.

*Example 2*

A solution of 194 g. of ethylacrylate, 54 g. of glycidyl methacrylate, 103 g. of methyl methacrylate, 36 g. of methacrylic acid, 54 g. of acrylonitrile, 12 g. of benzoyl peroxide and 300 g. of toluene is added dropwise over a period of 3 hours to a solution of 159 g. of 2-hydroxymethyl-5-norbornene in 300 g. of toluene at 70° C. The reaction mixture is maintained at 70° C. for an additional 3 hours. The reaction is mildly exothermic and intermittent cooling is required. 3 g. of benzoyl peroxide are added and the mixture is maintained at 70° C. for an additional 5 hours. The product is a dark yellow very viscous polymer solution which has a 37.8% solids content by weight which indicates a 75.6% conversion of monomers to polymer.

Baked films of this product display properties substantially the same as those displayed by the baked films in Example 1.

*Example 3*

A solution of 217 g. of butyl acrylate, 18 g. of glycidyl methacrylate, 12 g. of methacrylic acid, 6 g. of azobisisobutyronitrile and 150 g. of xylene is added dropwise over a period of 3 hours to a solution of 53 g. of 2-hydroxymethyl-5-norbornene and 150 g. of xylene at 70° C. The mixture is maintained at 70° C. for an additional 16 hours during which time, a first 1.5 g. of azobisisobutyronitrile is added after 3 hours, a second 1.5 g. after 8 hours, and a third 1.5 g. is added after a total of 12 hours. The product has a solids content of 44.8% by weight.

The resin solution is blended with a butylated triazine formaldehyde resin in a weight ratio (solids basis) of 6 parts of resin solution to 4 parts of triazine and the resulting blend is drawn down on a steel panel and baked at 177° C. for 30 minutes. The resulting film shows a good cure, high gloss, good flexibility and good soap, solvent, and detergent resistance.

*Example 4*

A solution of 231 g. of ethylhexyl acrylate, 18 g. of glycidyl methacrylate, 12 g. of methacrylic acid, 6 g. of azobisisobutyronitrile and 150 g. of toluene is added dropwise over a period of 3 hours to a solution of 39 g. of 2-hydroxymethyl-5-norbornene and 150 g. of toluene at 70° C. The mixture is maintained at 80° C. for 3 hours after which time 3 g. of azobisisobutyronitrile are added. The mixture is maintained at 70° C. for an additional 6 hours, at which time, an additional 3 g. of azobisisobutyronitrile are added. The mixture is then maintained at 70° C. for another 3 hours, making a total of 15 hours at 70° C. The reaction product has solids content of 44.6% by weight.

When a film of the product is cured at 177° C. for 30 minutes, a hard flexible coating with good detergent and solvent resistance results.

When this polymer is blended with a butylated triazine formaldehyde resin at a 6:4 ratio, it gives a compatible film. This blend is spread over a steel panel and baked for 30 minutes at 177° C. The resulting film is well cured, tough, flexible, has a high gloss and displays excellent resistance to soaps, solvents and detergents.

*Example 5*

A solution of 195 g. of ethyl acrylate, 27 g. of glycidyl methacrylate, 18 g. of methacrylic acid, 6 g. of azobisisobutyronitrile and 150 g. toluene is added dropwise over a period of 3 hours to a solution of 60 g. of 2-hydroxymethyl-5-norbornene and 150 g. of toluene at 70° C. The mixture is then maintained at 70° C. for an additional 4 hours. The resinous solution product has a solids content of 44.7% by weight and viscosity of Y on the Gardner-Holdt scale.

The resin solution is blended with a butylated triazine formaldehyde resin at a 6:4 solids ratio, spread on a steel panel and baked at 177° C. for 30 minutes. A hard film with good gloss and good soap, solvent and detergent resistance results.

*Example 6*

A solution of 168 g. of methyl methacrylate, 15 g. of acrylonitrile, 27 g. of glycidyl methacrylate, 18 g. of methacrylic acid, 6 g. of azobisisobutyronitrile and 150 g. of toluene are added dropwise over a period of 3 hours to a solution of 72 g. of 2-hydroxymethyl-5-norbornene in 150 g. of toluene at 70° C. The mixture is maintained at 70° C. for an additional 6 hours. The reaction product has a solids content of 42.9% by weight.

This resinous solution may be baked on metal in accordance with the procedure outlined in the previous examples to yield a hard surface film with good gloss and and fair flexibility. Although well cured the film produced is slightly brittle.

The reaction products of Examples 1 through 6 may be used as vehicles in white inks. A white ink is produced by adding 50 parts of rutile titanium dioxide to 50 parts of one of the reaction products of Examples 1 through 6. It will further be obvious to those skilled in the art that other pigments may be used in preparing pigmented surface coatings.

While there have been described what are at present considered to be the preferred embodiments of this invention, it will be obvious to one skilled in the art that various changes and modifications may be made therein without departing from the invention, and it is, therefore, aimed to cover all such changes and modifications as fall within the true spirit and scope of the invention.

I claim:

1. An organic solvent soluble copolymer made by the addition polymerization of (a) 5 to 30 by weight parts of non-allylic alcohol containing the norbornene nucleus, (b) 1 to 15 by weight parts of methacrylic acid, (c) 1 to 30 by weight parts of glycidyl methacrylate, and (d) 25 to 95 by weight parts of at least one member selected from the group consisting of olefinically unsaturated ester material having the formula

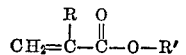

where R is a member selected from the group consisting of hydrogen, methyl and ethyl groups, and R' is an alkyl radical containing from 1 to 8 carbons, and acrylonitrile.

2. A copolymer of claim 1, being the product of the addition polymerization of 2-hydroxymethyl-5-norbornene, methacrylic acid, glycidyl methacrylate and methyl methacrylate.

3. A copolymer of claim 1, being the product of the addition polymerization of 2-hydroxymethyl-5-norbornene, methacrylic acid, glycidyl methacrylate, methyl methacrylate, ethyl acrylate and acrylonitrile.

4. A copolymer of claim 1, being the product of the addition polymerization of 2-hydroxymethyl-5-norbornene, methacrylic acid, glycidyl methacrylate, and butyl acrylate.

5. A heat curable surface coating composition comprising a volatile organic solvent solution of the copolymer of claim 1.

6. A heat curable surface coating composition comprising a volatile organic solvent solution of the copolymer of claim 2.

7. A heat curable surface coating composition comprising a volatile organic solvent solution of the copolymer of claim 3.

8. A heat curable surface coating composition comprising a volatile organic solvent solution of the copolymer of claim 4.

References Cited in the file of this patent
UNITED STATES PATENTS

| | | |
|---|---|---|
| 2,596,279 | Nichols et al. | May 13, 1952 |
| 2,723,971 | Cupery | Nov. 15, 1955 |
| 2,853,462 | Gaylord | Sept. 23, 1958 |
| 2,985,611 | Gaylord et al. | May 23, 1961 |